US012795765B2

(12) United States Patent
Yang

(10) Patent No.: US 12,795,765 B2
(45) Date of Patent: Nov. 10, 2026

(54) METHOD AND APPARATUS FOR PROCESSING RADIO LINK FAILURE, AND COMPUTER STORAGE MEDIUM

(71) Applicant: Beijing Xiaomi Mobile Software Co., Ltd., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 701 days.

(21) Appl. No.: 17/756,742

(22) PCT Filed: Dec. 2, 2019

(86) PCT No.: PCT/CN2019/122482
§ 371 (c)(1),
(2) Date: Jun. 1, 2022

(87) PCT Pub. No.: WO2021/108966
PCT Pub. Date: Jun. 10, 2021

(65) Prior Publication Data

US 2023/0007720 A1 Jan. 5, 2023

(51) Int. Cl.
*H04W 76/19* (2018.01)
*H04W 28/02* (2009.01)
*H04W 92/18* (2009.01)

(52) U.S. Cl.
CPC ....... *H04W 76/19* (2018.02); *H04W 28/0268* (2013.01); *H04W 92/18* (2013.01)

(58) Field of Classification Search
None
See application file for complete search history.

(56) References Cited

U.S. PATENT DOCUMENTS

| | | | | |
|---|---|---|---|---|
| 2017/0048822 | A1 | 2/2017 | Lee et al. | |
| 2018/0070400 | A1* | 3/2018 | Wu | H04W 4/06 |
| 2019/0254118 | A1* | 8/2019 | Dao | H04L 67/141 |
| 2020/0146094 | A1* | 5/2020 | Wu | H04W 80/08 |
| 2021/0105788 | A1* | 4/2021 | Kim | H04W 76/10 |
| 2021/0136856 | A1* | 5/2021 | Tseng | H04W 76/14 |
| 2021/0392533 | A1* | 12/2021 | Wang | H04W 4/40 |
| 2022/0117032 | A1* | 4/2022 | Han | H04L 1/08 |
| 2022/0150730 | A1* | 5/2022 | Freda | H04L 1/188 |
| 2022/0279617 | A1* | 9/2022 | Orsino | H04W 76/19 |
| 2022/0338301 | A1* | 10/2022 | Park | H04W 4/40 |

FOREIGN PATENT DOCUMENTS

| | | | |
|---|---|---|---|
| CN | 105101301 | A | 11/2015 |
| CN | 107360635 | A | 11/2017 |
| CN | 109328483 | A | 2/2019 |

(Continued)

OTHER PUBLICATIONS

Freda—U.S. Appl. No. 62/804,558, filed 2019.*

(Continued)

*Primary Examiner* — Andre Tacdiran
(74) *Attorney, Agent, or Firm* — McCoy Russell LLP

(57) ABSTRACT

A method for processing radio link failure includes: determining that a sidelink (SL) unicast radio link connection with at least one second user equipment (UE) fails; and performing SL data transmission with the at least one second UE through a third UE.

20 Claims, 6 Drawing Sheets

(56) References Cited

FOREIGN PATENT DOCUMENTS

| | | | |
|---|---|---|---|
| CN | 109691174 | A | 4/2019 |
| CN | 110380959 | A | 10/2019 |
| WO | 2017086618 | A1 | 5/2017 |
| WO | 2018006253 | A1 | 1/2018 |

OTHER PUBLICATIONS

Freda—U.S. Appl. No. 62/823,794, filed 2019.*
Freda—U.S. Appl. No. 62/840,741, filed 2019.*
Freda—U.S. Appl. No. 62/886,088, filed 2019.*
Freda—U.S. Appl. No. 62/908,898, filed 2019.*
Kim—U.S. Appl. No. 62/909,627, filed 2019.*
Orsino—U.S. Appl. No. 62/891,028, filed 2019.*
"Considerations on RLM for NR V2X unicast," Proceedings of the TSG-RAN WG2 Meeting #106, Huawei, HI Silicon, R2-1907419, May 13, 2019, Reno, Nevada, 4 pages.

* cited by examiner

METHOD AND APPARATUS FOR PROCESSING RADIO LINK FAILURE, AND COMPUTER STORAGE MEDIUM

CROSS REFERENCE TO RELATED APPLICATION

The present application is a U.S. National Phase of International Application No. PCT/CN2019/122482 entitled "METHOD AND APPARATUS FOR PROCESSING RADIO LINK FAILURE, AND COMPUTER STORAGE MEDIUM," and filed on Dec. 2, 2019. The entire contents of the above-listed application is hereby incorporated by reference for all purposes.

BACKGROUND

In order to support direct communication between user equipment (UE) and UE, a sidelink (SL) communication mode is introduced, and sidelink is sometimes called an auxiliary link or a side link.

Target UE is unique during sidelink unicast connection transmission, that is, it has nothing to do with other UE except the target UE, so data transmission is interrupted after failure occurs to a sidelink unicast radio link connection.

SUMMARY

According to a first aspect of the present disclosure, a method for processing radio link failure is provided. The method is performed by a first user equipment (UE) and includes:

determining that a sidelink (SL) unicast radio link connection with one or a plurality of second UEs fails; and performing SL data transmission with the second UE through a third UE.

According to a second aspect of the present disclosure, a method for processing radio link failure is provided. The method is performed by a third UE and includes:

establishing a sidelink (SL) unicast radio link connection with first UE and second UE respectively; and performing SL data transmission between the first UE and the second UE through the SL unicast connection radio link.

According to a third aspect of the present disclosure, an apparatus for processing radio link failure is provided and includes:

a processor; and a memory, configured to store an instruction executable by the processor.

The processor is configured to, by executing the executable instruction, implement the method for processing radio link failure in any one of the above technical solutions applied to a first UE side.

According to a fourth aspect of an example of the present disclosure, an apparatus for processing radio link failure is provided and includes:

a processor; and a memory, configured to store an instruction executable by the processor.

The processor is configured to, by executing the executable instruction, implement the method for processing radio link failure in any one of the above technical solutions applied to a third UE side.

It should be understood that the above general description and following detailed description are only illustrative and explanatory instead of limiting the present disclosure.

BRIEF DESCRIPTION OF THE DRAWINGS

Accompanying drawings here, which are incorporated in and constitute a part of the specification, illustrate examples consistent with the present disclosure and, together with the specification, serve to explain principles of the present disclosure.

DETAILED DESCRIPTION

Figure 1:
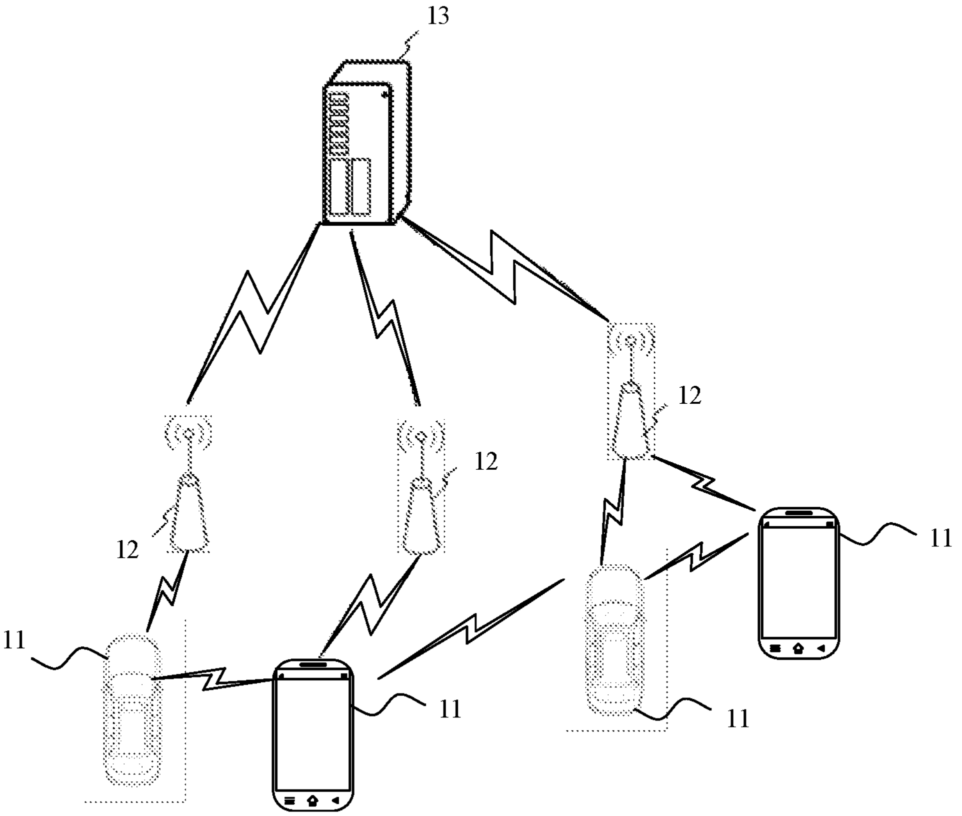
FIG. 1 is a schematic structural diagram of a wireless communication system shown according to an example.

The examples will be described in detail here and are shown in the drawings. Unless otherwise indicated, when the following description refers to the drawings, the same number in the different drawings represents the same or similar element. Implementations described in the following examples do not represent all implementations consistent with the examples of the present application. Rather, they are only examples of an apparatus and method consistent with some aspects of the examples of the present application as detailed in the appended claims.

Terms used in the examples of the present disclosure are only intended to describe specific examples instead of limiting the examples of the present disclosure. Singular forms "a", "an" and "the" used in the examples of the present disclosure and the appended claims intend to include a plural form unless other meanings are clearly indicated in context. It should be further understood that a term "and/or" used herein refers to and contains any one or all possible combinations of one or a plurality of associated listed items.

It should be understood that various information, possibly described by using terms such as first, second and third in the examples of the present disclosure, are not supposed to be limited to these terms. These terms are only used for distinguishing the same type of information. For example, without departing from the scope of the examples of the present disclosure, first information may be also called second information, and similarly, the second information may be also called the first information. Depending on the context, a word "if" and "in case of" used herein may be constructed as "when . . . ", "at the time of . . . " or "in response to determining".

The present disclosure relates to a communication technology, in particular to a method and apparatus for processing radio link failure, and a computer storage medium.

Please refer to FIG. 1, which shows a schematic structural diagram of a wireless communication system provided by an example of the present disclosure. As shown in FIG. 1, the wireless communication system is a communication system based on a cellular mobile communication technology and may include: a plurality of terminals 11 and a plurality of base stations 12.

Terminal 11 may refer to a device providing a voice and/or data connectivity for a user. The terminal 11 may communicate with one or a plurality of core networks via a radio access network (RAN). The terminal 11 may be an Internet of Things terminal, such as a sensor device, a mobile phone (or called "cell" phone) and a computer with the Internet of Things terminal, for example, may be a fixed, portable, pocket, hand-held, computer built-in or vehicle-mounted apparatus. For example, the terminal may be a station (STA), a subscriber unit, a subscriber station, a mobile station, a mobile, a remote station, an access point, a remote terminal, an access terminal, a user terminal, a user agent, a user device, or user equipment (UE). Or the terminal 11 may also be a device of an unmanned aerial vehicle. Or the terminal 11 may also be a vehicle-mounted device, for example, may be a trip computer with a wireless communication function, or a wireless communication device externally connected with the trip computer. Or the terminal 11 may also be a road-side infrastructure, for example, may be a street lamp, signal lamp or other road-side infrastructures, etc. with a wireless communication function.

Base station 12 may be a network side device in the wireless communication system. The wireless communication system may a 4th generation (4G) mobile communication system, also called a long term evolution (LTE) system; or the wireless communication system may also be a 5G system, also called a new radio (NR) system or a 5G NR system. Or the wireless communication system may also be a next generation system of the 5G system. An access network in the 5G system may be called a new generation-radio access network (NG-RAN). Or it is a machine-type communication (MTC) system.

The base station 12 may be an evolution base station (eNB) adopted in a 4G system. Or the base station 12 may also be a base station (gNB) of a centralized distributed architecture in the 5G system. When the base station 12 adopts the centralized distributed architecture, the base station usually includes a central unit (CU) and at least two distributed units (DU). A protocol stack of a packet data convergence protocol (PDCP) layer, a radio link control (RLC) layer and a media access control (MAC) layer is arranged in the central unit, a physical (PHY) layer protocol stack is arranged in the distributed units, and the examples of the present disclosure do not limit a specific implementation of the base station 12.

Wireless connection may be established between the base station 12 and the terminal 11 through an air interface. In different implementations, the air interface is an air interface based on the fourth generation (4G) mobile communication network technology standard, or the air interface is an air interface based on the fifth generation (5G) mobile communication network technology standard, for example, the air interface is a new radio, or the air interface may also be an air interface based on a next generation mobile communication network technology standard of 5G.

In some examples, an end to end (E2E) connection may also be established among the terminals 11. For example, there are scenes of vehicle to vehicle (V2V) communication, vehicle to Infrastructure (V2I) communication and vehicle to pedestrian (V2P) communication in vehicle to everything (V2X) communication.

In some examples, the above wireless communication system may also include a network management device 13.

The plurality of base stations 12 are connected with the network management device 13 respectively. The network management device 13 may be a core network device in the wireless communication system. For example, the network management device 13 may be a mobility management entity (MME) in an evolved packet core (EPC). Or the network management device may also be other core network devices, for example, a serving gate way (SGW), a public data network gate way (PGW), a policy and charging rules function (PCRF) unit or a home subscriber server (HSS) network side device, etc. The examples of the present disclosure do not limit an implementation form of the network management device 13.

Figure 2:
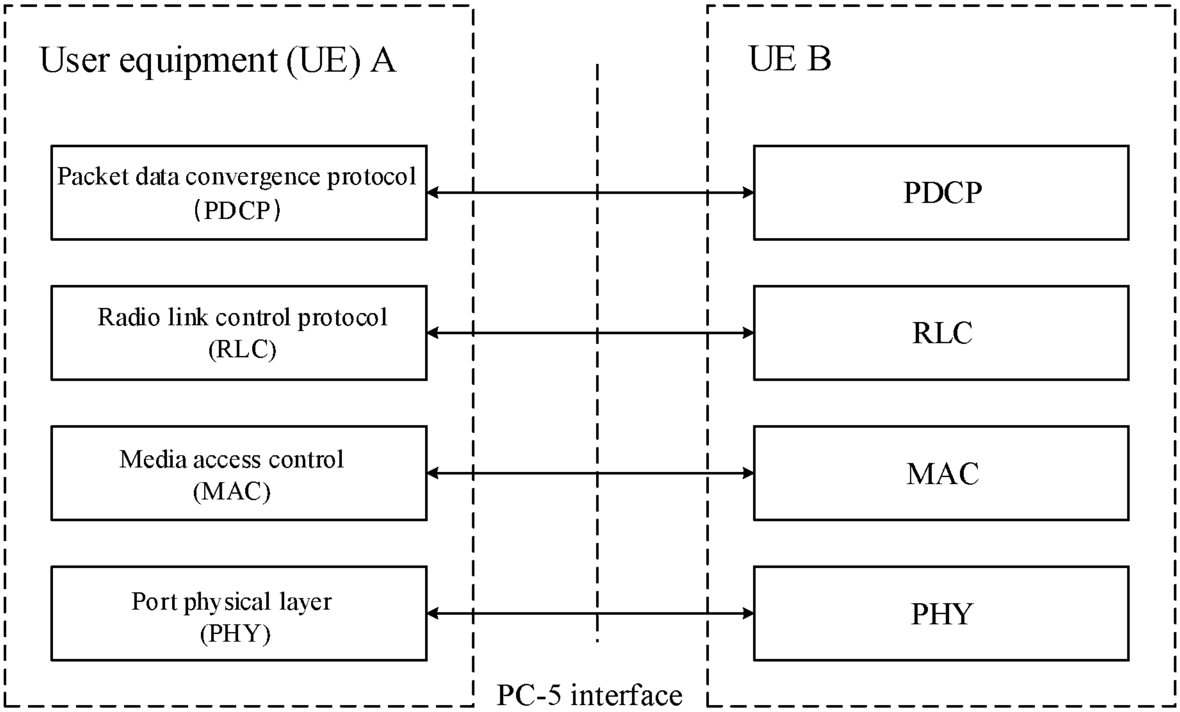
FIG. 2 is a schematic diagram of a protocol stack of a sidelink communication mode shown according to an example.

In the 4G times, in order to support direct communication between UE and UE, a sidelink communication mode is introduced. A protocol stack of the sidelink communication mode is shown in FIG. 2, and an interface between UE and UE is a PC-5 interface.

Addressing of sidelink transmission is realized through a source identifier and a target identifier of an MAC layer, and no connection needs to be established before transmission. Addressing is realized by adding a source identifier and a target identifier of a sidelink layer 2 to a protocol data unit (PDU) of an MAC layer during transmission of the sidelink data.

In the 5G times, in order to support transmission features and quality of service (QoS) of different services, a unicast/broadcast/multicast transmission mechanism is introduced. Unicast transmission supports feedback, radio link monitoring (RLM) measurement, transmitted power control and connection control, and each unicast connection corresponds to a pair of a source sidelink layer 2 identifier and a target sidelink layer 2 identifier. Before unicast transmission, unicast radio resource control (RRC) connection needs to be established between UE and UE, a PC5 RRC message may be sent between UE and UE so as to transmit UE capacity and radio bearer configuration, including a radio link control (RLC) transmission mode, a serial number length, a logic channel identifier, etc. After unicast connection is established, similar to Uu communication, the physical layer may indicate to a higher layer whether out-of-synchronization occurs according to measurement of a sidelink reference signal, after out-of-synchronization continues for a period of time, the RRC layer may announce that radio link failure occurs to corresponding sidelink unicast connection, a corresponding layer 2 target identifier is deleted, and the higher layer is informed of radio link failure of the corresponding layer 2 target identifier.

Target UE is unique during sidelink unicast connection transmission, that is, it has nothing to do with other UE except the target UE, so after failure occurs to a sidelink unicast radio link connection, data transmission cannot be recovered by reestablishing sidelink unicast connection with other UE, and data transmission is interrupted.

Based on the above wireless communication system, various examples of a method of the present disclosure are provided for how to recover data transmission of sidelink unicast connection to increase sidelink coverage when the sidelink unicast radio link connection fails.

Figure 3:
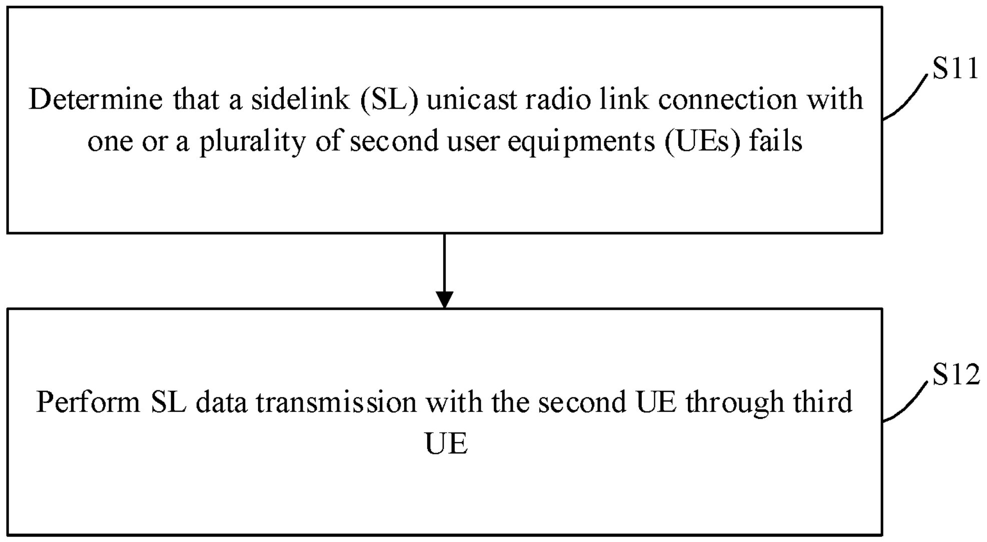
FIG. 3 is a first flowchart of a method for processing radio link failure shown according to an example.

FIG. 3 is a first flowchart of a method for processing radio link failure shown according to an example. As shown in FIG. 3, the method for processing radio link failure is applied to first user equipment (UE) and includes the following steps:

in step S11, it is determined that a sidelink (SL) unicast radio link connection with one or a plurality of second user equipments (UEs) fails; and in step S12, SL data transmission with the second UE is performed through third UE.

The second UE is UE except the first UE and the third UE.

The quantity of the second UE may be one or more than one.

That is, the SL unicast radio link connections between the first UE and the plurality of second UEs may fail at the same time.

When the SL unicast radio link connection between the first UE and one second UE fails in step S11, the second UE in step S12 refers to the unique second UE in step S11.

When the SL unicast radio link connections between the first UE and the plurality of second UEs fail in step S11, the second UE in step S12 refers to one of the plurality of second UEs in step S11, and the one second UE may establish SL unicast connection with the third UE.

Thus, the failure of an SL unicast radio link connection with one or a plurality of second UEs is determined, and SL data transmission with the second UE is performed through the third UE. Compared with no processing when the SL unicast radio link connection fails, by using the third UE as a relay device to forward SL data between the first UE and the second UE supported by the third UE, the SL unicast connection data transmission may be recovered through the third UE when the SL unicast radio link connection fails, such that increasing sidelink coverage.

In some examples, the method further includes: a connection message for indicating failure of the SL unicast radio link connection with the second UE is sent to the third UE.

Accordingly, the third UE may conveniently know failure information about the SL unicast radio link connection between the first UE and the second UE from the connection message, and detect whether it can provide a relay service for the first UE and the second UE.

In some examples, performing SL data transmission with the second UE through the third UE includes:

a response message returned by the third UE based on a connection message is received, and SL connection with the third UE is established, where SL connection is established between the third UE and the second UE; and SL data transmission with the second UE is performed through the third UE.

Accordingly, after the response message returned by the third UE based on the connection message is received, the third UE is served as a relay device to send SL data to the second UE, so that a problem of failure in sending the SL data due to inappropriate selection of connected relay UE is avoided.

It needs to be noted that before sending the connection message to the first UE, the third UE already establishes SL unicast direct connection with the second UE. Specifically, the third UE, after receiving the connection message, establishes SL unicast direct connection with the second UE. Or, the third UE, before receiving the connection message, already establishes SL unicast direct connection with the second UE.

In the above solution, the connection message further includes:

a sidelink layer 2 identifier of current UE;

a sidelink layer 2 identifier of the second UE; and quality of service (QoS) information of the SL data.

The current UE mentioned herein is the first UE.

In this way, the third UE may conveniently determine whether it can provide the relay service for the first UE and the second UE from these information carried in the connection message.

In some examples, the QoS information at least includes a QoS identifier.

For example, in response to determining that the QoS identifier of the SL data belongs to a standard QoS identifier, the QoS information is the QoS identifier.

In this way, the third UE may conveniently determine a QoS demand of the SL data according to the QoS identifier and then determine whether it is capable of forwarding the SL data between the first UE and the second UE.

In some examples, the QoS information at least includes the QoS identifier and a parameter corresponding to the QoS identifier.

For example, in response to determining that the QoS identifier of the SL data belongs to a private QoS identifier, the QoS information includes the QoS identifier and the parameter corresponding to the QoS identifier.

Accordingly, the third UE may conveniently determine the QoS demand of the SL data according to the QoS identifier and the parameter corresponding to the QoS identifier, such as performance index parameter, and then determine whether it is capable of forwarding the SL data between the first UE and the second UE.

In some examples, the connection message includes an identifier for indicating failure of the SL unicast radio link connection with one second UE.

Accordingly, the third UE may conveniently know radio link failure information of a single SL unicast direct radio link connection from the connection message and fast search for determining whether the third UE supports an object of the SL unicast direct radio link connection.

In some examples, the connection message includes N identifiers indicating failure of the N SL unicast radio link connections corresponding to N second UEs, and each identifier corresponds to one failed SL unicast radio link connection. N is positive integer.

For example, when the SL unicast radio link connections between the first UE and the second UEs fail, radio link failure information of each SL unicast direct radio link connection is carried in the connection message in groups, and each group of radio link failure information includes the sidelink layer 2 identifier of the first UE, the sidelink layer 2 identifier of the second UE and the QoS information of the SL data.

Accordingly, the third UE may conveniently know radio link failure information of a plurality of SL unicast direct radio link connections once from the connection message, and determine specific failure information of each SL unicast direct radio link connection by recognizing each group of radio link failure information so as to fast search for an object of the SL unicast direct radio link connection supported by the third UE.

In some examples, the connection message includes M identifiers for indicating failure of the N SL unicast radio link connections corresponding to N second UEs, and each identifier corresponds to one failed SL unicast radio link connection, or a plurality of failed SL unicast radio link connections.

For example, N SLs correspond to M identifiers, M is smaller than N, some of which is one identifier corresponding to one SL, and some of which is one identifier corresponding to the plurality of SLs.

Accordingly, the third UE may conveniently know radio link failure information of the plurality of SL unicast direct radio link connections once from the connection message, and determine specific failure information of each SL unicast direct radio link connection by recognizing each group of radio link failure information so as to fast search for an object of the SL unicast direct radio link connection supported by the third UE.

In some examples, the connection message for indicating failure of the SL unicast radio link connection is sent by broadcasting.

Accordingly, the third UE serving as the relay device may be fast found.

For example, the connection message is radio resource control (RRC) reestablishment message. In this way, the RRC reestablishment message may be fully utilized, and signaling overhead is reduced.

Certainly, the connection message may also be a set message supported or recognized by all UE.

In the technical solution of the example of the present disclosure, the failure of an SL unicast radio link connection with one or a plurality of second UEs is determined, and SL data transmission with the second UE is performed through third UE. Compared with no processing when the SL unicast radio link connection between the first UE and the second UE fails, by using the third UE as a relay device to forward SL data between the first UE and the second UE, the purpose of recovering data transmission through the relay UE after the SL unicast radio link connection fails may be realized.

Figure 4:
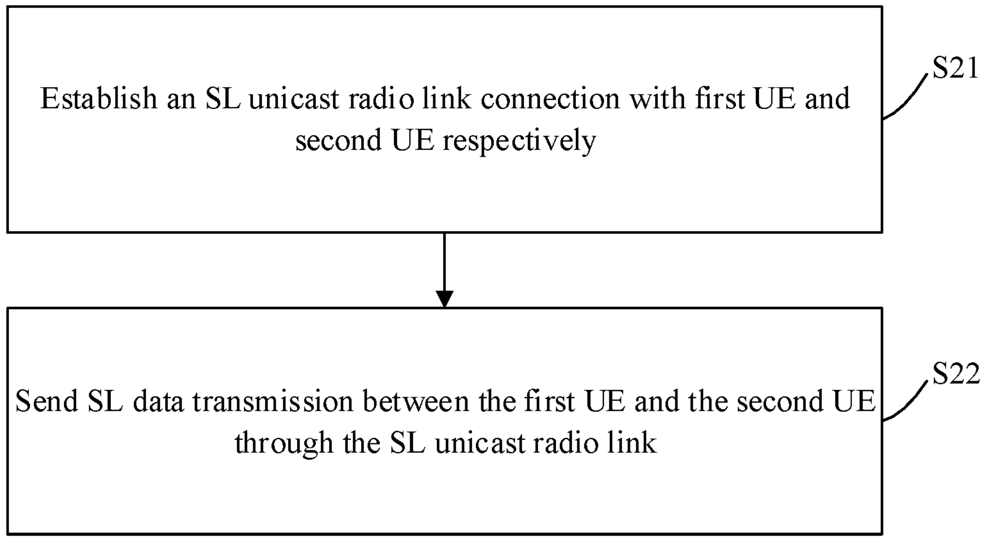
FIG. 4 is a second flowchart of a method for processing radio link failure shown according to an example.

FIG. 4 is a second flowchart of a method for processing radio link failure shown according to an example. As shown in FIG. 4, the method for processing radio link failure is applied to third UE and includes the following steps.

In step S21, an SL unicast radio link connection is established with first UE and second UE respectively; and In step S22, SL data transmission between the first UE and the second UE is sent through the SL unicast connection radio link.

Accordingly, relay UE forwards SL data between the first UE and the second UE, and the purpose of recovering data transmission after the SL unicast radio link connection between the first UE and the second UE fails may be realized.

In some examples, before establishing the SL unicast radio link connection with the first UE, the method further includes:

a connection message, sent by the first UE, for indicating failure of the SL unicast radio link connection between the first UE and the second UE is received; and a response message is sent to the first UE based on the connection message, where SL connection is established between the third UE and the second UE.

Accordingly, a problem of failure in recovering data transmission due to inappropriate time of sending the response message may be avoided.

In some examples, before sending the response message to the first UE based on the connection message, the method further includes:

- whether the SL unicast radio link connection with the second UE is able to meet a demand of the SL data transmission is determined based on the connection message; and
- the response message is sent to the first UE in response to determining that the demand of the SL data transmission is able to be met.

For example, a QoS demand of the SL data is determined based on the QoS information in the connection message, whether the QoS demand of the SL data is able to be met is determined according to a channel condition of the SL unicast radio link connection with the second UE, and the response message is sent to the first UE in response to determining that the QoS demand of the SL data is able to be met.

Accordingly, a problem of failure in recovering data transmission due to incapability of forwarding the SL data between the first UE and the second UE may be avoided.

In the above solution, the connection message further includes:

a sidelink layer 2 identifier of the first UE;

a sidelink layer 2 identifier of the second UE; and

QoS information of the SL data.

Accordingly, the third UE may conveniently determine first UE and second UE which have SL unicast radio link connection failure and determine whether it can provide a relay service for the first UE and the second UE according to these information carried in the connection message.

In the above solution, the QoS information at least includes a QoS identifier;

or, the QoS information at least includes the QoS identifier and a parameter corresponding to the QoS identifier.

In the above solution, the connection message includes an identifier for indicating failure of the SL unicast radio link connection with one second UE;

or, the connection message includes N identifiers for indicating failure of the N SL unicast radio link connections corresponding to N second UEs, and each identifier corresponds to one failed SL unicast radio link connection.

In this way, the third UE may conveniently determine a QoS demand of the SL data according to the connection message of the first UE and then determine whether the third UE is capable of forwarding the SL data between the first UE and the second UE.

In some examples, the connection message may be a connection message sent by the first UE by broadcasting. In this way, the third UE serving as the relay device may be fast found.

For example, the connection message is an RRC reestablishment message. In this way, the RRC reestablishment message may be fully utilized, and signaling overhead is reduced.

In the above solution, the response message includes a sidelink layer 2 identifier of the third UE, and a sidelink layer 2 identifier of current relayed second UE.

Accordingly, when the connection message of the first UE indicates that the SL unicast radio link connections between the first UE and the plurality of second UEs fail, the first UE is informed of the second UE that the third UE can support relay through the response message, the problem of failure in recovering data transmission due to the situation that the first UE forwards, through the third UE, SL data which are not supported by the third UE is prevented.

In the technical solution of the example of the present disclosure, the third UE may serve as the relay device to forward the SL data when the unicast radio link connection between the first UE and the second UE fails, and purpose of recovering data transmission through the relay UE after the failure occurs to the SL unicast radio link connection may be realized.

Figure 5:
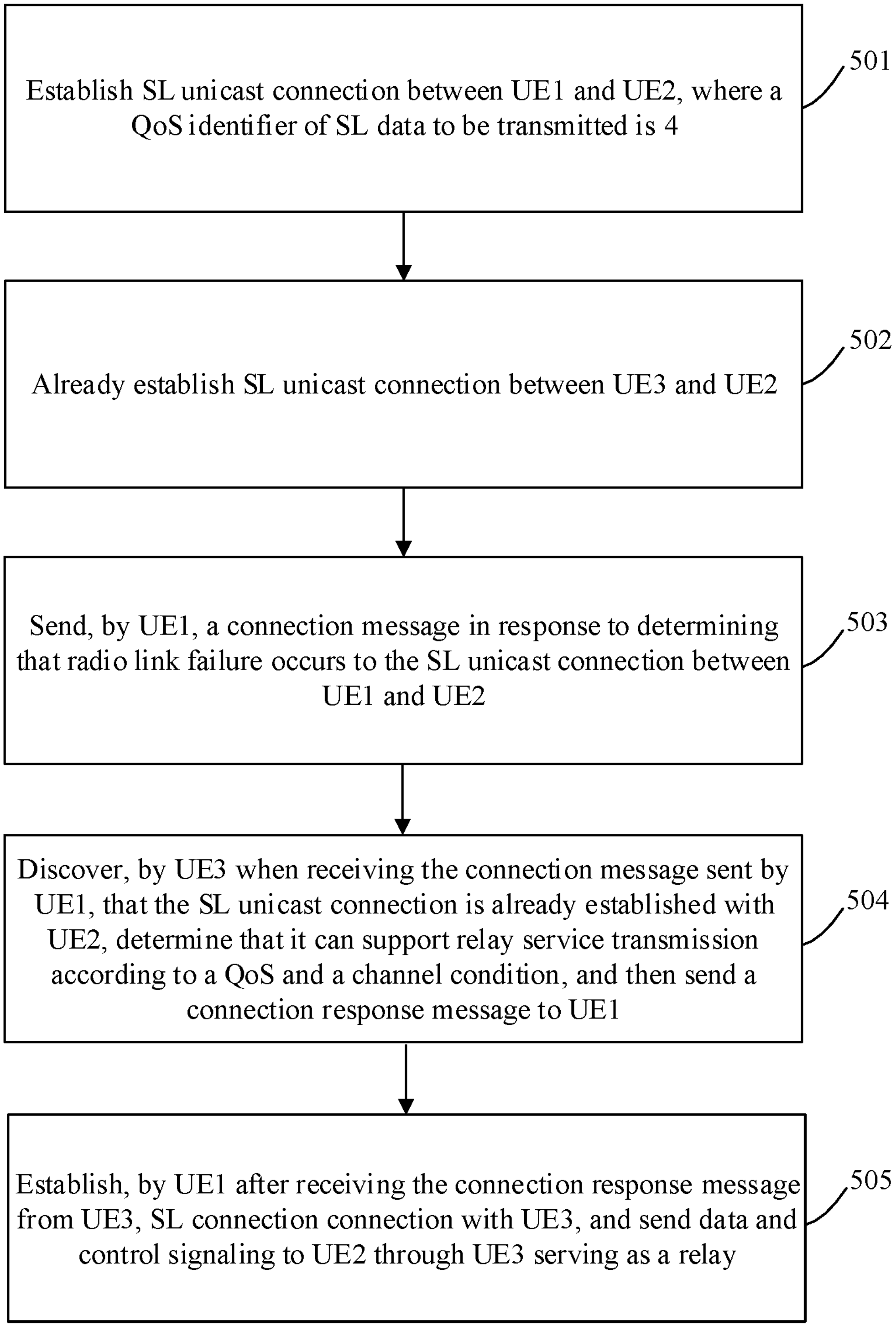
FIG. 5 is a processing flowchart of forwarding data through relay UE shown according to an example.

FIG. 5 is a processing flowchart of forwarding data through relay UE shown according to an example. The flow includes the following steps.

Step 501, SL unicast connection is established between UE1 and UE2, and a QoS identifier of the SL data to be transmitted is 4.

QoS identifier is 4, which belongs to a non-standard QoS identifier and whose corresponding performance index parameter includes: rate 1 Mb/s, and time delay 50 ms.

In step 502, SL unicast connection is already established between UE3 and UE2.

In step 503, UE1 sends the connection message in response to determining that radio link failure occurs to the SL unicast connection between UE1 and UE2.

The connection message includes the following information:

an identifier of source UE: the sidelink layer 2 identifier of UE1;

an identifier of failed UE: the sidelink layer 2 identifier of UE2; and

QoS information: rate 1 MB/s, and time delay 50 ms.

In step 504, UE3, when receiving the connection message sent by UE1, discovers that the SL unicast connection is already established with UE2, determines that it can support relay service transmission according to a QoS and a channel condition, and sends a connection response message to UE1.

The connection response message includes the following information:

an identifier of failed UE: the sidelink layer 2 identifier of UE2; and an identifier of source UE: the sidelink layer 2 identifier of UE3.

In step 505, UE1, after receiving the connection response message from UE3, establishes SL unicast connection with UE3, and sends data and control signaling to UE2 through UE3 serving as a relay.

In the solution of the example, in response to failure of the SL unicast radio link connection between UE1 and UE2, the SL data between UE1 and UE2 is forwarded through UE3 serving as the relay device, and recovering of SL unicast connection data transmission through UE3 after the SL unicast radio link connection between UE1 and UE2 fails may be realized.

It needs to be noted that the flow and the QoS information are illustrative and may be set or adjusted according to actual conditions and design demands.

Figure 6:
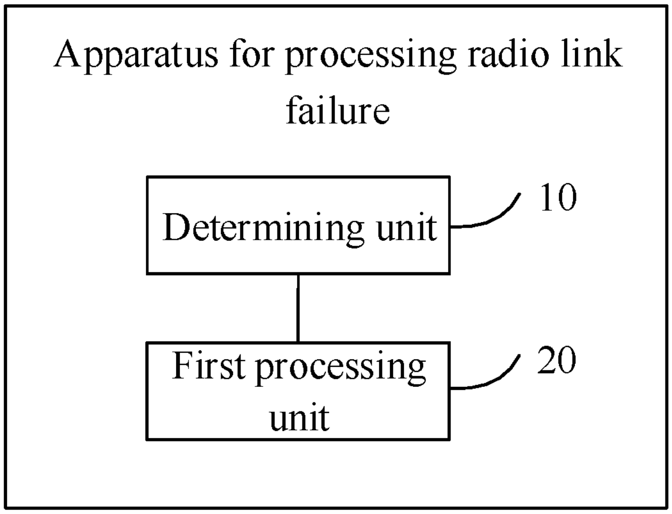
FIG. 6 is a first block diagram of an apparatus for processing radio link failure shown according to an example.

FIG. 6 is a first block diagram of an apparatus for processing radio link failure shown according to an example. The apparatus for processing radio link failure is applied to a first UE side. Referring to FIG. 6, the apparatus includes a determining unit 10 and a first processing unit 20.

The determining unit 10 is configured to determine that a sidelink (SL) unicast radio link connection with one or a plurality of second user equipments (UEs) fails.

The first processing unit 20 is configured to perform SL data transmission with the second UE through third UE.

In the above solution, the first processing unit 20 is further configured to: send, to the third UE, a connection message for indicating failure of an SL unicast radio link connection with the second UE.

In the above solution, the first processing unit 20 is further configured to: send the connection message for indicating failure of the SL unicast radio link connection by broadcasting.

In the above solution, the first processing unit 20 is configured to:

receive a response message returned by the third UE based on the connection message, and establish SL connection with the third UE, where SL connection is established between the third UE and the second UE; and perform SL data transmission with the second UE through the third UE.

In the above solution, the connection message further includes:

a sidelink layer 2 identifier of current UE;

a sidelink layer 2 identifier of the second UE; and quality of service (QoS) information of SL data.

In the above solution, the QoS information at least includes a QoS identifier;

or, the QoS information at least includes the QoS identifier and a parameter corresponding to the QoS identifier.

In the above solution, the connection message includes an identifier for indicating failure of the SL unicast radio link connection with one second UE;

or, the connection message includes N identifiers for indicating failure of N SL unicast radio link connections corresponding to N second UEs, and each identifier corresponds to one failed SL unicast radio link connection.

As for the apparatus in the above example, specific modes of executing operations by each module are already described in detail in the example of the related method and will not be described in detail here.

In actual application, specific structures of both the above determining unit 10 and the first processing unit 20 may be realized by a Central Processing Unit (CPU), a Micro Controller Unit (MCU), a Digital Signal Processing (DSP) or a Programmable Logic Controller (PLC) and the like in the apparatus for processing radio link failure or the first UE to which the apparatus for processing radio link failure belongs.

The apparatus for processing radio link failure of the example may be configured on a first UE side.

Those ordinarily skilled in the art should understand that functions of each processing module in the apparatus for processing radio link failure in the example of the present disclosure may refer to related description of the above method for processing radio link failure applied to the first UE side for understanding, and each processing module in the apparatus for processing radio link failure in the example of the present disclosure may be realized through an analog circuit which realizes functions of the example of the present disclosure, or realized by running, on a terminal, software which executes the functions of the example of the present disclosure.

By means of the apparatus for processing radio link failure of the example of the present disclosure, after the SL unicast radio link connection fails, the SL data between the first UE and the second UE when the unicast radio link connection fails may be forwarded by the third UE serving as the relay device, and the purpose of recovering data transmission through the relay UE after the SL unicast radio link connection fails may be realized.

Figure 7:
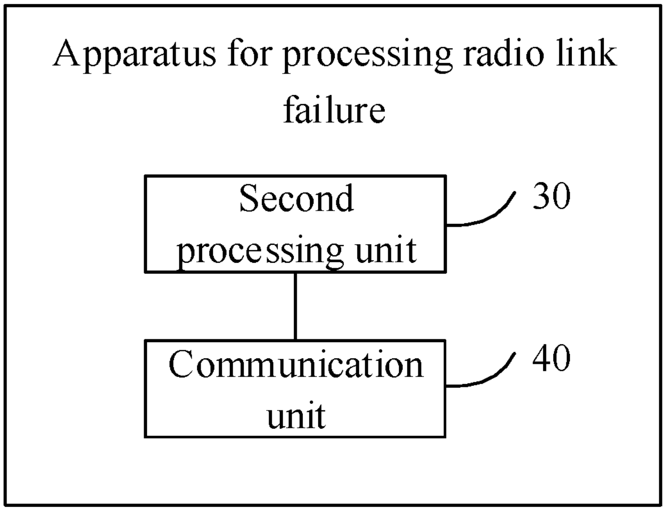
FIG. 7 is a second block diagram of an apparatus for processing radio link failure shown according to an example.

FIG. 7 is a second block diagram of an apparatus for processing radio link failure shown according to an example. The apparatus for processing radio link failure is applied to a third UE side. Referring to FIG. 7, the apparatus includes a second processing unit 30 and a communication unit 40.

The second processing unit 30 is configured to establish an SL unicast radio link connection with the first UE and the second UE respectively.

The communication unit 40 is configured to perform SL data transmission between the first UE and the second UE through the SL unicast connection radio link.

In the above solution, the communication unit 40 is further configured to:

receive a connection message, sent by the first UE, for indicating failure of the SL unicast radio link connection between the first UE and the second UE; and send a response message to the first UE based on the connection message, where SL connection is established between the third UE and the second UE.

In the above solution, the communication unit 40 is further configured to:

determine, based on the connection message, whether the SL unicast radio link connection with the second UE is able to meet a demand of SL data transmission; and send the response message to the first UE in response to determining that the demand of the SL data transmission is able to be met.

In the above solution, the connection message is a connection message sent by the first UE by broadcasting.

In the above solution, the connection message further includes:

a sidelink layer 2 identifier of the first UE;

a sidelink layer 2 identifier of the second UE; and

QoS information of the SL data.

In the above solution, the QoS information at least includes a QoS identifier;

or, the QoS information at least includes the QoS identifier and a parameter corresponding to the QoS identifier.

In the above solution, the connection message includes an identifier for indicating failure of the SL unicast radio link connection with one second UE;

or, the connection message includes N identifiers for indicating failure of N SL unicast radio link connections corresponding to N second UEs, and each identifier corresponds to one failed SL unicast radio link connection.

In the above solution, the connection message is an RRC reestablishment message.

In the above solution, the response message includes a sidelink layer 2 identifier of the third UE, and a sidelink layer 2 identifier of current relayed second UE.

As for the apparatus in the above example, specific modes of executing operations by each module are already described in detail in the example of the related method and will not be described in detail here.

In actual application, specific structures of the above second processing unit 30 and the communication unit 40 may be realized by a CPU, an MCU, a DSP or PLC in the apparatus for processing radio link failure or the third UE to which the apparatus for processing radio link failure belongs.

The apparatus for processing radio link failure of the example may be configured on a third UE side.

Those ordinarily skilled in the art should understand that functions of each processing module in the apparatus for processing radio link failure in the example of the present disclosure may refer to related description of the above method for processing radio link failure applied to the third UE side for understanding, and each processing module in the apparatus for processing radio link failure in the example of the present disclosure may be realized through an analog circuit which realizes functions of the example of the present disclosure, or realized by running, on a terminal, software which executes the functions of the example of the present disclosure.

The apparatus for processing radio link failure of the example of the present disclosure can serve as a relay device to forward the SL data between the first UE and the second UE when the unicast radio link connection fails, and the purpose of recovering data transmission through relay UE after the SL unicast radio link connection fails may be realized.

Figure 8:
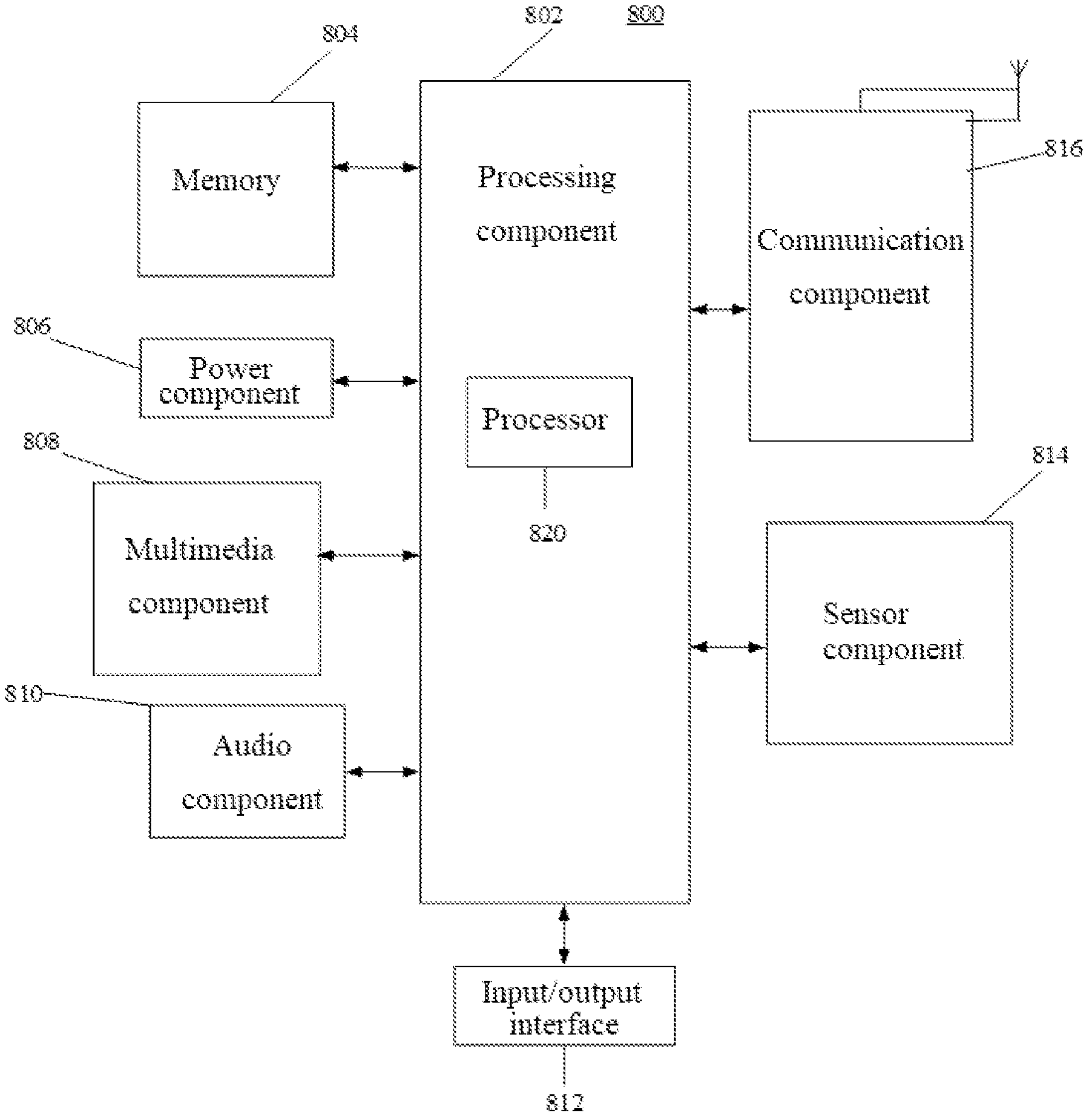
FIG. 8 is a block diagram of an apparatus 800 for processing radio link failure shown according to an example.

FIG. 8 is a block diagram of an apparatus 800 for processing radio link failure shown according to an example. For example, the apparatus 800 may be a mobile phone, a computer, a digital broadcast terminal, a messaging device, a game console, a tablet device, a medical device, a fitness device, a personal digital assistant, and the like.

Referring to FIG. 8, the apparatus 800 may include one or more components as follows: a processing component 802, a memory 804, a power component 806, a multimedia component 808, an audio component 810, an input/output (I/O) interface 812, a sensor component 814 and a communication component 816.

The processing component 802 generally controls whole operation of the apparatus 800, such as operations related to display, phone call, data communication, camera operation and recording operation. The processing component 802 may include one or more processors 820 for executing the instructions so as to complete all or part of steps of the above method. Besides, the processing component 802 may include one or more modules to facilitate interaction between the processing component 802 and the other components. For example, the processing component 802 may include a multimedia module so as to facilitate interaction between the multimedia component 808 and the processing component 802.

The memory 804 is configured to store various data so as to support operations on the apparatus 800. Examples of these data include instructions of any application program or method for operation on the apparatus 800, contact person data, telephone directory data, messages, pictures, videos and the like. The memory 804 may be realized by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 806 provides power for the various components of the apparatus 800. The power component 806 may include a power management system, one or more power sources, and other components related to power generation, management and distribution for the apparatus 800.

The multimedia component 808 includes a screen which provides an output interface between the apparatus 800 and a user. In some examples, the screen may include a liquid crystal display (LCD) and a touch panel (TP). If the screen includes the touch panel, the screen may be realized as a touch screen so as to receive an input signal from the user. The touch panel includes one or more touch sensors so as to sense touching, swiping and gestures on the touch panel. The touch sensor can not only sense a boundary of a touching or swiping action, but also detect duration and pressure related to touching or swiping operation. In some examples, the multimedia component 808 includes a front camera and/or a back camera. When the apparatus 800 is in an operation mode, such as a photographing mode or a video mode, the front camera and/or the back camera can receive external multimedia data. Each front camera and each back camera may be a fixed optical lens system or have a focal length and an optical zoom capability.

The audio component 810 is configured to output and/or input an audio signal. For example, the audio component 810 includes a microphone (MIC). When the apparatus 800 is in the operation mode, such as a call mode, a recording mode and a voice recognition mode, the microphone is configured to receive an external audio signal. The received audio signal may be further stored in the memory 804 or sent via the communication component 816. In some examples, the audio component 810 further includes a speaker for outputting the audio signal.

The I/O interface 812 provides an interface between the processing component 802 and a peripheral interface module, and the peripheral interface module may be a keyboard, a click wheel, buttons and the like. These buttons may include but are not limited to: a home button, a volume button, a start button and a lock button.

The sensor component 814 includes one or more sensors, configured to provide state evaluation of various aspects for the apparatus 800. For example, the sensor component 814 may detect a start/shut-down state of the apparatus 800 and relative positioning of the components, for example, the components are a display and a keypad of the apparatus 800. The sensor component 814 may further detect position change of the apparatus 800 or one component of the apparatus 800, whether there is contact between the user and the apparatus 800, and azimuth or speeding up/speeding down and temperature change of the apparatus 800. The sensor component 814 may include a proximity sensor, configured to detect existence of a nearby object without any physical contact. The sensor component 814 may further include an optical sensor, such as a Complementary Metal Oxide Semiconductor (CMOS) or Charge-coupled Device (CCD) image sensor, for use in imaging application. In some examples, the sensor component 814 may further include an acceleration sensor, a gyroscope sensor, a magnetic sensor, a pressure sensor or a temperature sensor.

The communication component 816 is configured to facilitate wired or wireless communication between the apparatus 800 and the other devices. The apparatus 800 may be accessed to a wireless network based on a communication standard, such as Wi-Fi, 2G or 3G, or their combination. In an example, the communication component 816 receives a broadcast signal or related broadcast information from an external broadcast management system via a broadcast channel In an example, the communication component 816 further includes a Near Field Communication (NFC) module so as to facilitate short-range communication. For example, the NFC module may be realized based on a Radio Frequency Identification (RFID) technology, an Infra-red Data Association (IrDA) technology, an Ultra Wide Band (UWB) technology, a Blue Tooth (BT) technology and other technologies In an example, the apparatus 800 may be realized by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above method for processing radio link failure applied to a user equipment side.

In an example, a non-transitory computer storage medium including executable instructions is further provided, such as a memory 804 including the executable instructions. The executable instructions may be executed by the processor 820 of the apparatus 800 so as to complete the above method. For example, the non-transitory computer storage medium may be an ROM, a random access memory (RAM), a CD-ROM, a magnetic tape, a floppy disk, an optical data storage device and the like.

Figure 9:
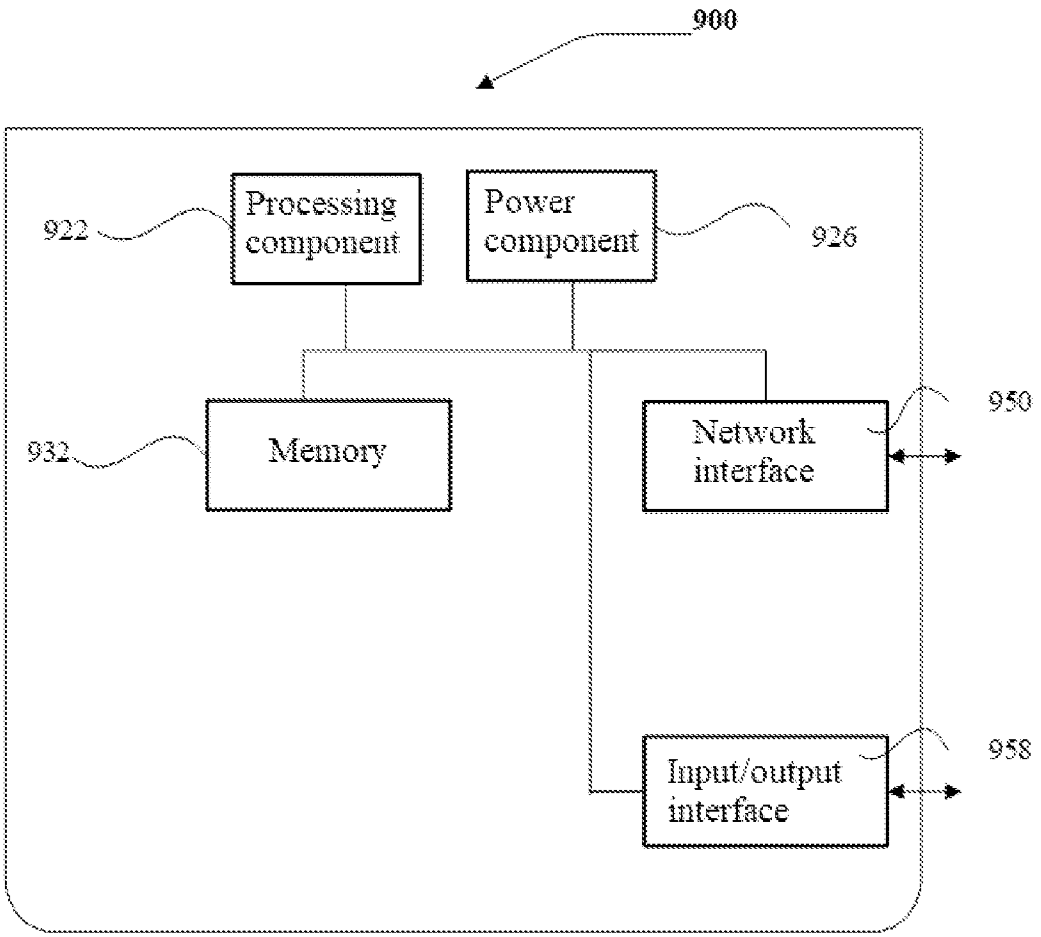
FIG. 9 is a block diagram of an apparatus 900 for processing radio link failure shown according to an example.

FIG. 9 is a block diagram of an apparatus 900 for processing radio link failure shown according to an example. For example, the apparatus 900 may be provided as a server. Referring FIG. 9, the apparatus 900 includes a processing component 922 and further includes one or a plurality of processors, and a memory resource represented by a memory 932 which is configured to store an instruction executable by the processing component 922, for example, an application program. The application program stored in the memory 932 may include one or more than one module each of which corresponds to a set of instructions. Besides, the processing component 922 is configured to execute the instruction so as to execute the above method for processing radio link failure applied to a base station side.

The apparatus 900 may further include a power component 926 configured to execute power management of the apparatus 900, a wired or wireless network interface 950 configured to connect the apparatus 900 to a network, and an input/output (I/O) interface 958. The apparatus 900 may operate an operation system stored in the memory 932, for example, Windows Server™, Mac OS X™, Unix™, Linux™, FreeBSD™ or the like.

The technical solutions recorded in the examples of the present disclosure may be combined at will without a conflict.

According to a first aspect of an example of the present disclosure, a method for processing radio link failure is provided and includes:

determining that a sidelink (SL) unicast radio link connection with one or a plurality of second user equipments (UEs) fails; and performing SL data transmission with the second UE through a third UE.

In the above solution, the method further includes: sending, to the third UE, a connection message for indicating failure of an SL unicast radio link connection with the second UE.

In the above solution, the connection message for indicating failure of the SL unicast radio link connection is sent by broadcasting.

In the above solution, performing SL data transmission with the second UE through the third UE includes:

receiving a response message returned by the third UE based on the connection message, and establishing SL connection with the third UE, where SL connection is established between the third UE and the second UE; and performing the SL data transmission with the second UE through the third UE.

In the above solution, the connection message further includes:

a sidelink layer 2 identifier of current UE;

a sidelink layer 2 identifier of the second UE; and quality of service (QoS) information of SL data.

In the above solution, the QoS information at least includes a QoS identifier;

or, the QoS information at least includes the QoS identifier and a parameter corresponding to the QoS identifier.

In the above solution, the connection message includes an identifier for indicating failure of the SL unicast radio link connection with one second UE;

or, the connection message includes N identifiers for indicating failure of N SL unicast radio link connections corresponding to N second UEs, and each identifier corresponds to one failed SL unicast radio link connection.

In the above solution, the connection message is a radio resource control (RRC) reestablishment message.

According to a second aspect of an example of the present disclosure, a method for processing radio link failure is provided and includes:

establishing a sidelink (SL) unicast radio link connection with first UE and second UE respectively; and performing SL data transmission between the first UE and the second UE through the SL unicast connection radio link.

In the above solution, before establishing the SL unicast radio link connection with the first UE, the method further includes:

receiving a connection message, sent by the first UE, for indicating failure of an SL unicast radio link connection between the first UE and the second UE; and sending a response message to the first UE based on the connection message, where SL connection is established between the third UE and the second UE.

In the above solution, the method further includes:

determining, based on the connection message, whether the SL unicast radio link connection with the second UE is able to meet a demand of SL data transmission; and sending the response message to the first UE in response to determining that the demand of the SL data transmission is able to be met.

In the above solution, the connection message is a connection message sent by the first UE by broadcasting.

In the above solution, the connection message further includes:

a sidelink layer 2 identifier of the first UE;

a sidelink layer 2 identifier of the second UE; and

QoS information of the SL data.

In the above solution, the QoS information at least includes a QoS identifier;

or, the QoS information at least includes the QoS identifier and a parameter corresponding to the QoS identifier.

In the above solution, the connection message includes an identifier for indicating failure of the SL unicast radio link connection with one second UE;

or, the connection message includes N identifiers for indicating failure of the N SL unicast radio link connections corresponding to N second UEs, and each identifier corresponds to one failed SL unicast radio link connection.

In the above solution, the connection message is an RRC reestablishment message.

In the above solution, the response message includes a sidelink layer 2 identifier of the third UE, and a sidelink layer 2 identifier of current relayed second UE.

According to a third aspect of an example of the present disclosure, an apparatus for processing radio link failure is provided and includes:

a determining unit, configured to determine that a sidelink (SL) unicast radio link connection with one or a plurality of second user equipments (UEs) fails; and a first processing unit, configured to perform SL data transmission with the second UE through third UE.

According to a fourth aspect of an example of the present disclosure, an apparatus for processing radio link failure is provided and includes:

a second processing unit, configured to establish a sidelink (SL) unicast radio link connection with first UE and second UE respectively; and a communication unit, configured to perform SL data transmission between the first UE and the second UE through the SL unicast radio link.

According to a fifth aspect of an example of the present disclosure, an apparatus for processing radio link failure is provided and includes:

a processor; and a memory, configured to store an instruction executable by the processor.

The processor is configured to, by executing the executable instruction, implement the method for processing radio link failure in any one of the above technical solutions applied to a first UE side.

According to a sixth aspect of an example of the present disclosure, an apparatus for processing radio link failure is provided and includes:

a processor; and a memory, configured to store an instruction executable by the processor.

The processor is configured to, by executing the executable instruction, implement the method for processing radio link failure in any one of the above technical solutions applied to a third UE side.

According to a seventh aspect of an example of the present disclosure, a computer storage medium is provided and stores an executable instruction. The executable instruction, after being executed by a processor, can implement the method for processing radio link failure in any one of the above technical solutions applied to a first UE side.

According to an eighth aspect of an example of the present disclosure, a computer storage medium is provided and stores an executable instruction. The executable instruction, after being executed by a processor, can implement the method for processing radio link failure in any one of the above technical solutions applied to a third UE side.

The technical solutions provided by the examples of the present disclosure may include one of the following beneficial effects:

The failure of a sidelink (SL) unicast radio link connection with one or a plurality of second UEs is determined, and SL data transmission with the second UE is performed through third UE. Compared with no processing when the SL unicast radio link connection between the first UE and the second UE fails, by using the third UE as a relay device to forward SL data between the first UE and the second UE, the purpose of recovering data transmission through the relay UE after the SL unicast radio link connection fails may be realized.

Those skilled in the art will easily figure out other implementation solutions of the present disclosure after considering the specification and practicing the disclosure disclosed herein. The present application intends to cover any transformation, purpose or adaptive change of the present disclosure which conforms to a general principle of the present disclosure and includes common general knowledge or conventional technical means which are not disclosed by the present disclosure in the technical field. The specification and the examples are only illustrative, the true scope and spirit of the present disclosure are indicated by the following claims.

It should be understood that the present disclosure is not limited to an accurate structure described above and shown in the drawings and various modifications and changes can be made without departing from its scope. The scope of the present disclosure is limited only by the appended claims.

The invention claimed is:

1. A method for processing radio link failure, performed by a first user equipment (UE) and comprising:
determining that a sidelink (SL) unicast radio link connection with at least one second UE fails;
performing SL data transmission with the at least one second UE through a third UE; and
sending, to the third UE, a connection message for indicating failure of the SL unicast radio link connection with the at least one second UE, wherein the connection message comprises M identifiers for indicating failure of N SL unicast radio link connections corresponding to N second UEs, and each identifier corresponds to a plurality of failed SL unicast radio link connections, wherein M and N are positive integers, and M is less than N;
wherein performing the SL data transmission with the at least one second UE through the third UE comprises:
receiving a response message returned by the third UE based on the connection message, and establishing an SL connection with the third UE, wherein the SL connection is established between the third UE and the at least one second UE; and
performing the SL data transmission with the at least one second UE through the third UE.

2. The method according to claim 1, wherein the connection message for indicating the failure of the SL unicast radio link connection is sent by broadcasting.

3. The method according to claim 1, wherein the connection message further comprises:
a sidelink layer 2 identifier of a current UE;
a sidelink layer 2 identifier of the at least one second UE; and
quality of service (QoS) information of SL data.

4. The method according to claim 3, wherein
the QoS information at least comprises a QoS identifier; or,
the QoS information at least comprises the QoS identifier and a parameter corresponding to the QoS identifier.

5. The method according to claim 1, wherein the connection message is a radio resource control (RRC) reestablishment message.

6. The method according to claim 1, wherein the SL connection between the third UE and the at least one second UE is a connection established before the third UE receives the connection message.

7. The method according to claim 1, wherein the connection message is a message that the third UE is configured to determine whether to provide a relay service for the first UE and the at least one second UE.

8. The method according to claim 1, wherein the connection message further comprises a set message supported or recognized by all UEs.

9. An apparatus for processing radio link failure, comprising:
a processor; and
a memory, configured to store an instruction executable by the processor, wherein
the processor is configured to:
determine that a sidelink (SL) unicast connection radio link with at least one second user equipment (UE) fails;
perform SL data transmission with the at least one second UE through a third UE; and
send, to the third UE, a connection message for indicating failure of the SL unicast radio link connection with the at least one second UE, wherein the connection message comprises M identifiers for indicating failure of N SL unicast radio link connections corresponding to N second UEs, and each identifier corresponds to a plurality of failed SL unicast radio link connections, wherein M and N are positive integers, and M is less than N;
wherein the processor is configured to:
receive a response message returned by the third UE based on the connection message, and establish an SL connection with the third UE, wherein the SL connection is established between the third UE and the at least one second UE; and
perform the SL data transmission with the at least one second UE through the third UE.

10. The apparatus according to claim 9, wherein the connection message for indicating the failure of the SL unicast radio link connection is sent by broadcasting.

11. The apparatus according to claim 9, wherein the connection message further comprises:
a sidelink layer 2 identifier of a current UE;
a sidelink layer 2 identifier of the at least one second UE; and
quality of service (QoS) information of SL data.

12. The apparatus according to claim 11, wherein the QoS information at least comprises a QoS identifier;
or,
the QoS information at least comprises the QoS identifier and a parameter corresponding to the QoS identifier.

13. The apparatus according to claim 9, wherein the connection message is a radio resource control (RRC) reestablishment message.

14. The method according to claim 9, wherein the SL connection between the third UE and the at least one second UE is a connection established before the third UE receives the connection message.

15. The method according to claim 9, wherein the connection message is a message that the third UE is configured to determine whether to provide a relay service for the first UE and the at least one second UE.

16. The method according to claim 9, wherein the connection message further comprises a set message supported or recognized by all UEs.

17. A non-transitory computer storage medium storing executable instructions, wherein the executable instructions, when executed by a processor, cause the processor to:
determine that a sidelink (SL) unicast connection radio link with at least one second user equipment (UE) fails;
perform SL data transmission with the at least one second UE through a third UE; and
send, to the third UE, a connection message for indicating failure of the SL unicast radio link connection with the at least one second UE, wherein the connection message comprises M identifiers for indicating failure of N SL unicast radio link connections corresponding to N second UEs, and each identifier corresponds to a plurality of failed SL unicast radio link connections, wherein M and N are positive integers, and M is less than N;

wherein the executable instructions, when executed by the processor, cause the processor to:

receive a response message returned by the third UE based on the connection message, and establish an SL connection with the third UE, wherein the SL connection is established between the third UE and the at least one second UE; and perform the SL data transmission with the at least one second UE through the third UE.

18. The storage medium according to claim 17, wherein the connection message for indicating the failure of the SL unicast radio link connection is sent by broadcasting.

19. The method according to claim 17, wherein the SL connection between the third UE and the at least one second UE is a connection established before the third UE receives the connection message.

20. The method according to claim 17, wherein the connection message is a message that the third UE is configured to determine whether to provide a relay service for the first UE and the at least one second UE.

* * * * *